(12) United States Patent
Gaertner et al.

(10) Patent No.: US 8,908,209 B2
(45) Date of Patent: Dec. 9, 2014

(54) ALTERING A PDF PRINT JOB BASED UPON CRITERIA STORED IN MEMORY OF A PRINTING SYSTEM

(71) Applicants: Joseph P. Gaertner, Lafayette, CO (US); Simon P. Jones, Warwick (GB); Michael Lotz, Longmont, CO (US); Thomas Margolis, Boulder, CO (US); Neil McKinstrie, Nuneaton (GB); Joe Stradling, Firestone, CO (US); Scott Ziegler, Westminster, CO (US)

(72) Inventors: Joseph P. Gaertner, Lafayette, CO (US); Simon P. Jones, Warwick (GB); Michael Lotz, Longmont, CO (US); Thomas Margolis, Boulder, CO (US); Neil McKinstrie, Nuneaton (GB); Joe Stradling, Firestone, CO (US); Scott Ziegler, Westminster, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 0 days.

(21) Appl. No.: 13/712,307

(22) Filed: Dec. 12, 2012

(65) Prior Publication Data

US 2013/0155436 A1    Jun. 20, 2013

Related U.S. Application Data

(60) Provisional application No. 61/576,300, filed on Dec. 15, 2011.

(51) Int. Cl.
*G06F 3/12* (2006.01)
*G06K 15/00* (2006.01)
*G06F 15/00* (2006.01)
*G06K 1/00* (2006.01)
*G06F 17/21* (2006.01)
*G06F 17/22* (2006.01)

(52) U.S. Cl.
CPC ........... *G06F 3/1254* (2013.01); *G06F 3/1208* (2013.01); *G06F 3/1222* (2013.01); *G06F 3/1238* (2013.01); *G06F 3/1243* (2013.01); *G06F 3/1246* (2013.01); *G06F 3/1285* (2013.01); *G06F 17/211* (2013.01); *G06F 17/227* (2013.01); *G06F 17/218* (2013.01); *G06F 17/2247* (2013.01); *G06F 17/2264* (2013.01)
USPC .......................... 358/1.15; 358/1.14; 358/1.9

(58) Field of Classification Search
None
See application file for complete search history.

(56) References Cited

U.S. PATENT DOCUMENTS

| | | | | |
|---|---|---|---|---|
| 6,547,831 | B1 * | 4/2003 | Kueny | 715/235 |
| 8,553,263 | B2 * | 10/2013 | Mori | 358/1.15 |
| 8,749,812 | B2 * | 6/2014 | Kodera | 358/1.15 |
| 2002/0078100 | A1 * | 6/2002 | Tewari | 707/523 |
| 2005/0050466 | A1 * | 3/2005 | Sangroniz et al. | 715/526 |
| 2005/0125724 | A1 * | 6/2005 | Peiro et al. | 715/517 |
| 2005/0125728 | A1 * | 6/2005 | Peiro et al. | 715/523 |
| 2006/0017946 | A1 * | 1/2006 | Peiro et al. | 358/1.11 |
| 2006/0023238 | A1 | 2/2006 | Blacszyk et al. | |
| 2010/0238512 | A1 | 9/2010 | Kimura | |
| 2012/0081746 | A1 * | 4/2012 | Yamaguchi | 358/1.15 |
| 2012/0320419 | A1 * | 12/2012 | Ito | 358/1.15 |

* cited by examiner

*Primary Examiner* — Satwant Singh
(74) *Attorney, Agent, or Firm* — Duft Bornsen & Fettig LLP

(57) ABSTRACT

Systems and methods are provided for altering the content of a PDF print job. The printing system includes a memory, an interface, and a markup engine. The memory includes criteria for identifying Portable Document Format (PDF) content stored in print jobs, and also includes a mark-up instruction for altering printable PDF content stored in print jobs, where the mark-up instruction references one or more of the criteria. The interface is operable to receive a PDF print job for processing. The markup engine is operable to access the mark-up instruction, to review the PDF print job to identify multiple segments of the print job that each include PDF content that matches the one or more criteria referenced by the mark-up instruction, and to alter the identified segments based on the mark-up instruction.

20 Claims, 6 Drawing Sheets

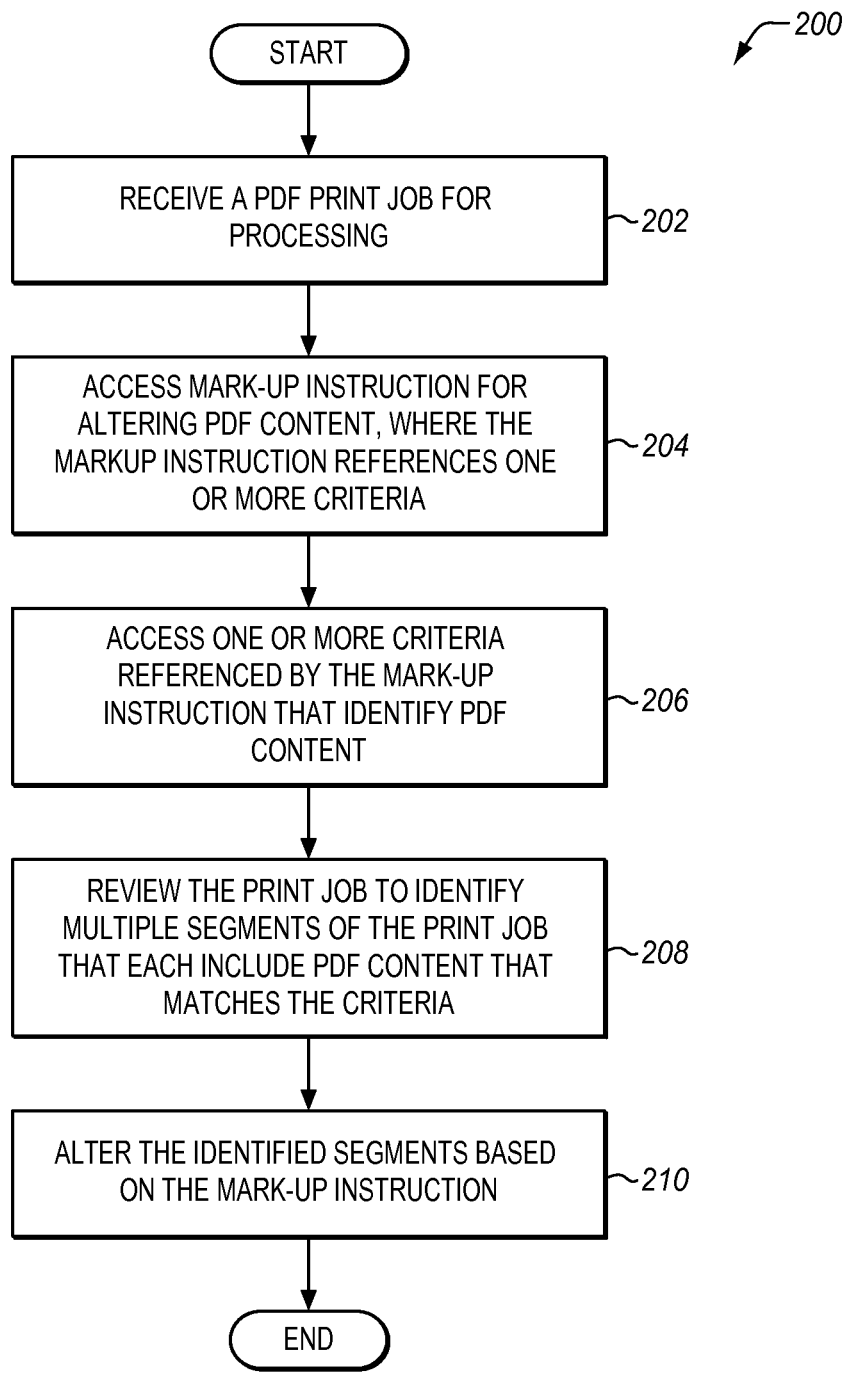

FIG. 3

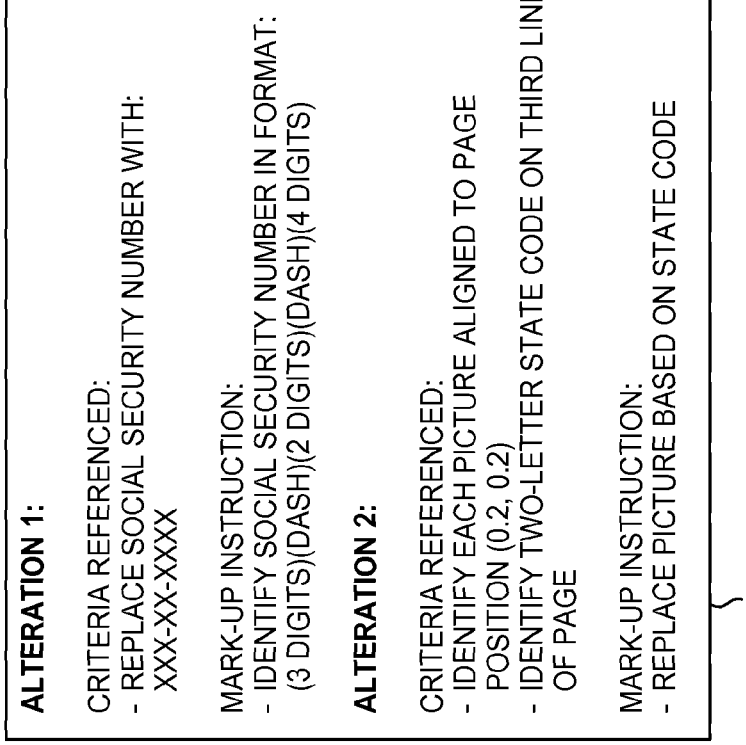

ALTERATION 1:

CRITERIA REFERENCED:
- REPLACE SOCIAL SECURITY NUMBER WITH: XXX-XX-XXXX

MARK-UP INSTRUCTION:
- IDENTIFY SOCIAL SECURITY NUMBER IN FORMAT: (3 DIGITS)(DASH)(2 DIGITS)(DASH)(4 DIGITS)

ALTERATION 2:

CRITERIA REFERENCED:
- IDENTIFY EACH PICTURE ALIGNED TO PAGE POSITION (0.2, 0.2)
- IDENTIFY TWO-LETTER STATE CODE ON THIRD LINE OF PAGE

MARK-UP INSTRUCTION:
- REPLACE PICTURE BASED ON STATE CODE

John Doe
3215 NE 132nd St
Townsville, CO

BILL DETAILS
-ITEM 1
-ITEM 2
-ITEM 3

SSN: 123-45-6789

Jane Doe
1216 53rd Ave
Wilson, ND

BILL DETAILS
-ITEM 1
-ITEM 2
-ITEM 3

SSN: 111-11-1111

FIG. 4

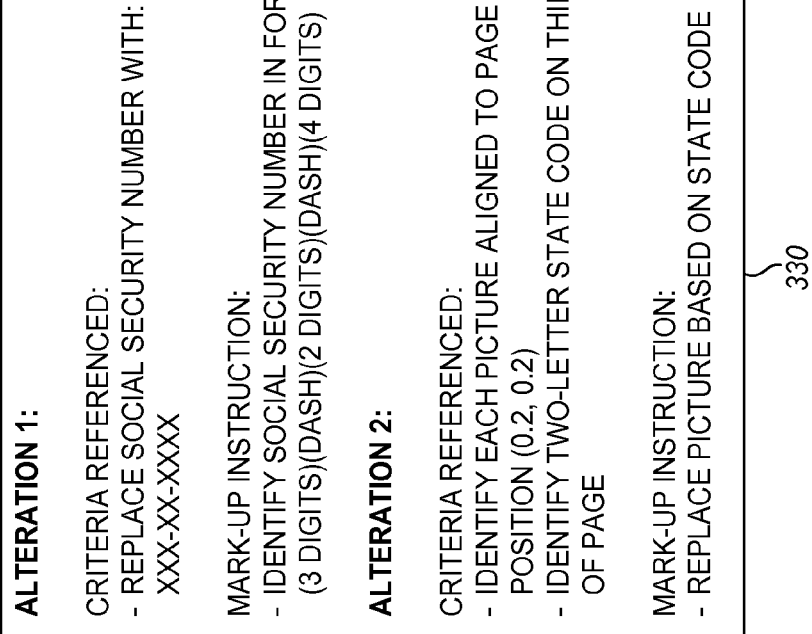

ALTERATION 1:

CRITERIA REFERENCED:
- REPLACE SOCIAL SECURITY NUMBER WITH: XXX-XX-XXXX

MARK-UP INSTRUCTION:
- IDENTIFY SOCIAL SECURITY NUMBER IN FORMAT: (3 DIGITS)(DASH)(2 DIGITS)(DASH)(4 DIGITS)

ALTERATION 2:

CRITERIA REFERENCED:
- IDENTIFY EACH PICTURE ALIGNED TO PAGE POSITION (0.2, 0.2)
- IDENTIFY TWO-LETTER STATE CODE ON THIRD LINE OF PAGE

MARK-UP INSTRUCTION:
- REPLACE PICTURE BASED ON STATE CODE

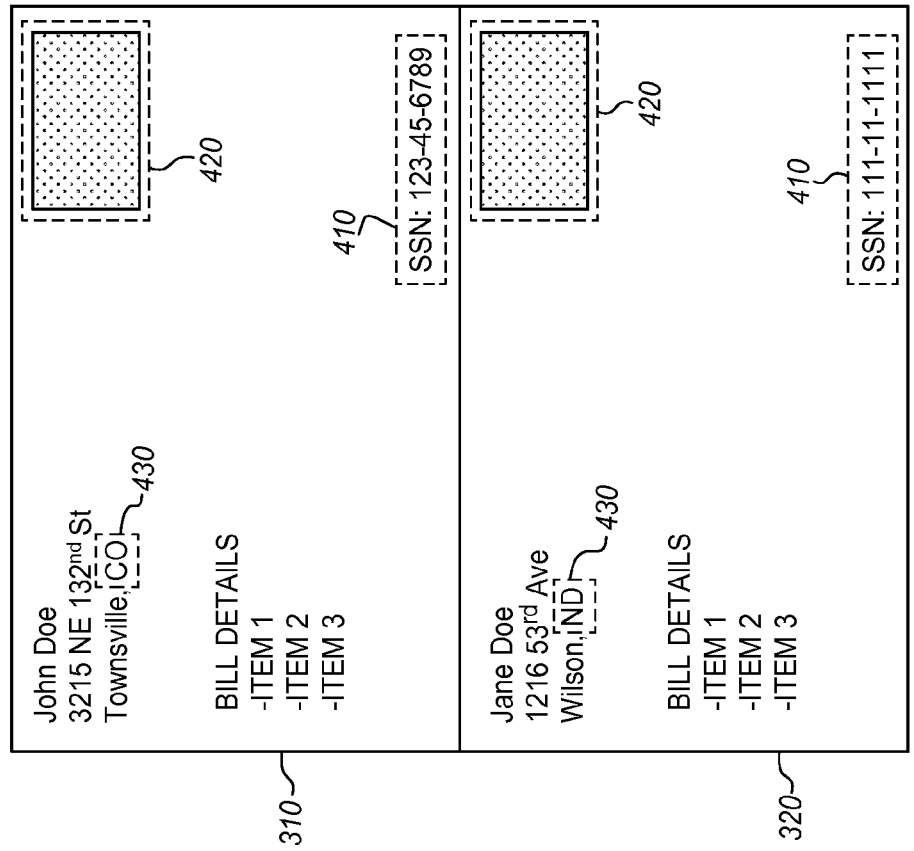

ALTERING A PDF PRINT JOB BASED UPON CRITERIA STORED IN MEMORY OF A PRINTING SYSTEM

RELATED APPLICATIONS

This application claims priority to commonly owned U.S. provisional patent application No. 61/576,300, filed Dec. 15, 2011, entitled "AUTOMATED PDF WORKFLOW PROCESSING" which is hereby incorporated by reference.

FIELD OF THE INVENTION

The invention relates to the field of printing, and in particular, to printing Portable Document Format (PDF) print jobs.

BACKGROUND

Portable Document Format (PDF) is a file format used to exchange documents across many different computer platforms. A PDF file is self-contained, which means that the text, graphics, fonts, and other features used by the PDF file are all included within the PDF file. In printing systems, print jobs may be submitted as PDF files. For example, a PDF file may be used by a printing system to generate mail pieces, documents, books, etc. In production printing environments, each PDF file may be segmented into thousands of individual documents, where each document is a mail piece that is one or more pages long.

PDF is a useful printing format because it is self-contained. However, it is problematic to manipulate PDF data on a large scale within the print shop environment. For example, a user who has received an incoming PDF print job from a customer may manually edit the PDF print job on a page-by-page basis in order to meet a customer's demands (e.g., to alter printable content such as text or images within the PDF print data, etc.). However, this is a very time-consuming process. This problem is amplified when incoming PDF print jobs from a customer consistently require the same modifications before printing, because the incoming PDF data must be manually edited over and over again. Thus, it remains expensive and time-consuming to perform large-scale editing operations upon PDF print jobs that have already been received for printing at a printing system.

SUMMARY

Embodiments described herein include a printing system that is able to automatically change the contents of a PDF print job based on criteria and mark-up instructions stored in the printing system's memory. A criterion evaluates the state of a portion of print data (e.g., a page) in a print job to determine whether printable PDF content on that portion meets certain conditions (e.g., the existence of specified text or images). A mark-up instruction alters the printable PDF content (e.g., changes an advertisement included within billing statements, anonymizes billing statements). A mark-up instruction references one or more criteria, and executes if its referenced criteria are fulfilled. Using mark-up instructions with criteria allows a printing system to quickly apply changes to multiple documents within received PDF print jobs at once. Thus, operations that would normally have to be manually applied to PDF print jobs can now be performed automatically in a well-defined and accurate manner.

One embodiment is a printing system that includes a memory, interface, and markup engine. The memory includes criteria for identifying Portable Document Format (PDF) content stored in print jobs, and also includes a mark-up instruction for altering printable PDF content stored in print jobs, where the mark-up instruction references one or more of the criteria. The interface is operable to receive a PDF print job for processing. The markup engine is operable to access the mark-up instruction, to review the PDF print job to identify multiple segments of the print job that each include PDF content that matches the one or more criteria referenced by the mark-up instruction, and to alter the identified segments based on the mark-up instruction.

Another embodiment is a method. The method includes receiving, at an interface of a printing system, a Portable Document Format (PDF) print job for processing, and accessing, from a memory of the printing system, a mark-up instruction for altering printable PDF content stored in the print job. The mark-up instruction references one or more criteria stored in the memory. The method further includes accessing, from the memory, the one or more criteria referenced by the mark-up instruction, where the criteria identify PDF content stored in the print job. Additionally, the method includes reviewing, via a markup engine of the printing system, the PDF print job to identify multiple segments of the print job that each include PDF content that matches the referenced criteria, and altering the identified segments based on the mark-up instruction.

Another embodiment comprises a non-transitory computer-readable medium embodying programmed instructions which, when executed by a processor, are operable for performing a method. The method includes receiving, at an interface of a printing system, a Portable Document Format (PDF) print job for processing, and accessing, from a memory of the printing system, a mark-up instruction for altering printable PDF content stored in the print job. The mark-up instruction references one or more criteria stored in the memory. The method further includes accessing, from the memory, the one or more criteria referenced by the mark-up instruction, where the criteria identify PDF content stored in the print job. Additionally, the method includes reviewing, via a markup engine of the printing system, the PDF print job to identify multiple segments of the print job that each include PDF content that matches the referenced criteria, and altering the identified segments based on the mark-up instruction.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 2 is a flowchart illustrating a method for automatically and globally altering PDF print data within a print job in an exemplary embodiment.

FIG. 3 is a block diagram illustrating two mail pieces separated by a page break in an exemplary embodiment.

FIG. 4 is a block diagram illustrating regions identified on the two mail pieces of FIG. 3 in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
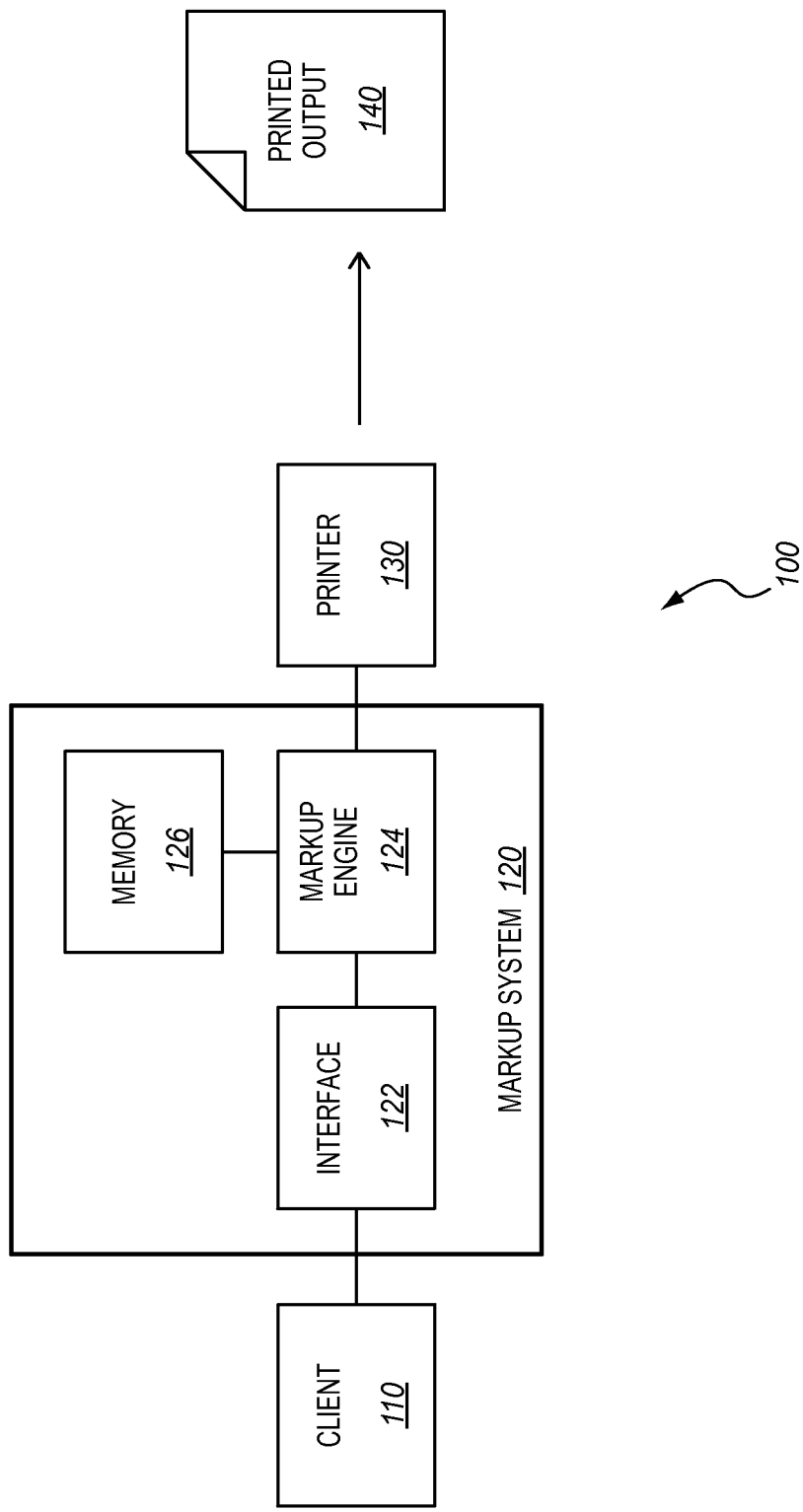
FIG. 1 is a block diagram of a printing system in an exemplary embodiment.

FIG. 1 is a block diagram of a printing system 100 in an exemplary embodiment. Printing system 100 is used to print incoming PDF print jobs submitted to a print shop by a customer. During normal operation, printing system 100 receives PDF print jobs from a software client 110. The received print jobs are printed by printer 130 in order to generate printed output (e.g., printed output 140). In this manner, printing system 100 processes digital data in order to manufacture physical printed goods.

Printing system 100 has been enhanced to include markup system 120. Markup system 120 is used to modify the printable content of received PDF print jobs on, so that the received print jobs will appear different from their original versions when they are printed. Modifying the printable content of a received PDF print job can enable an operator of printing system 100 to make last-minute alterations to the print job, even after it has been received for printing at the print shop. Thus, even though the received PDF print job has already been finalized by a customer, it can be revised at the print shop immediately before printing as desired.

Markup system 120 includes interface 122, which receives incoming print jobs from client 110. Markup system 120 further includes memory 126, which stores criteria for identifying portions of the print job, and also stores mark-up instructions for altering identified portions of the print job. The mark-up instructions each reference one or more of the criteria that will be met in order for an alteration to take place. The associations between mark-up instructions and criteria can be redefined without altering the mark-up instructions or criteria themselves. In this way, each mark-up instruction may reference arbitrary and overlapping sets of one or more criteria to perform the appropriate alterations to any desired portions of the print job. Markup system 120 additionally includes markup engine 124.

When revising PDF print data, markup engine 124 identifies criteria referenced by the mark-up instructions, and uses the referenced criteria to identify segments of printable PDF content that will be altered. Markup engine 124 then accesses the identified segment and alters it within the print job based on the mark-up instructions (e.g., the modification may be performed by inserting, modifying, or removing printable content from the identified portions). Once the segment has been altered by markup engine 124, the modified print job is sent to printer 130 for printing. This process changes the way that the print job will appear after it has been printed by printer 130. These alterations may be performed, for example, to anonymize personal information in the PDF print job or to add advertisements to specific locations within the print job.

Printer 130 prints incoming PDF jobs that have been revised by markup system 120, and comprises any system, component, or device operable to mark print media. For example, printer 130 may include a print controller and a marking engine operable to place toner or ink onto paper.

The operation of printing system 100 will be described with regard to FIG. 2 below. Assume, for this embodiment, that printing system 100 has initialized within a print shop, and further assume that client 110 has submitted a new PDF print job to markup system 120 for processing.

FIG. 2 is a flowchart illustrating a method for automatically altering PDF print data within a print job in an exemplary embodiment. The PDF print job includes one or more segments of printable PDF content that will each be altered by the method of FIG. 2. A segment of printable PDF content is a collection of PDF print data that will be physically marked by printer 130 onto print media during processing. A segment also repeats (in format or substance) throughout the print job. For example, a segment of printable content can be one billing statement for a customer out of a print job that includes multiple billing statements, can be a mailing address that includes a name and zip code, can be a chapter of a book, etc. The borders between individual segments can be indicated by printable content (e.g., a chapter title with a given font, size, and location on the page can indicate a border between segments), or can be indicated by non-printing tags (e.g., metadata) within the print job.

The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order. While method 200 describes applying a single mark-up instruction, printing system 100 may apply numerous mark-up instructions at once or in sequence.

In step 202, interface 122 of markup engine 120 receives a PDF print job for processing. The PDF print job may be divided into thousands of individual segments of printable PDF content. For example, each segment of printable content may be a mail piece of one or more logical pages that will be sent to a customer, such as a billing statement for a credit card.

In step 204, markup engine 124 accesses a mark-up instruction for altering segments of PDF content stored in the print job. Each mark-up instruction indicates how to change segments made up of printable PDF content. Each mark-up instruction also references one or more criteria stored in memory 126. The criteria that are referenced by each mark-up instruction are conditions that will be satisfied in order for the alteration indicated by the mark-up instruction to be performed. Multiple criteria referenced by a mark-up instruction can be arbitrarily concatenated with logical AND operators and logical OR operators to create a single logical statement which defines a matching state for a segment. In order to determine whether to apply a mark-up instruction (as well as where to apply a mark-up instruction), markup engine 124 will check to see whether the set of criteria referenced by that mark-up instruction have been met.

In one embodiment, each mark-up instruction is associated with a list that links to one or more selected criteria. Such a list may further include one or more logical operators (e.g., AND, OR) that are used to relate the selected criteria to each other, in order to form a logical set of criteria.

In step 206, markup engine 124 accesses the set of criteria referenced by the mark-up instruction for identifying PDF content stored in the print job. The criteria may also indicate how to distinguish different segments of the print job from each other (e.g., how to identify the separate mail pieces of a print job from each other). Examples of criteria and mark-up instructions are further illustrated with regard to FIGS. 3-5, described below.

In step 208, markup engine 124 reviews the print job to identify segments of the print job that each include PDF content that matches the criteria referenced by the mark-up instruction. This process may be performed by markup engine 124 parsing the PDF print data of each segment to determine whether it matches conditions defined by the criteria. Criteria can be compounded together as additional or alternative requirements. For example if a print job includes multiple statements in different languages, several criteria could be used to determine document boundaries based on the location of instances of text that state "page 1 of" and are located in the bottom-right corner of a page. For each language, the criteria would use the appropriate translation of "page 1 of". Then, a document boundary could be identified if any of the various translations were found at the bottom-right corner of the page. Thus, the criteria can co-exist with each other as alternative or additional conditions that should be satisfied.

In step 208, markup engine 124 alters the matching segments of PDF print data using the mark-up instruction. Thus, if the appropriate set of criteria are fulfilled in a given segment, then the mark-up instructions are executed (e.g. to retrieve the text found in a certain location, to insert the text into a barcode, and to add the barcode to the page at another location). Altering the segments will typically include revising printable PDF content (e.g., text and images) within the PDF print data so that the segments appear differently when printed. For example, altering the print data may include removing personal information such as social security numbers, addresses, or names, or could include adding such information back into each segment based on a barcode that uniquely identifies each segment. Altering the print data may also include adding new content such as images, barcodes, Optical Mark Recognition (OMR) marks, or external pages from another PDF.

Mark-up instructions and associated criteria may be applied in groups by markup engine 124 to modify the segments of print data. For example, it may be appropriate to use one set of mark-up instructions (and associated criteria) to insert a barcode into each mail piece, while at the same time using another set of mark-up instructions (and associated criteria) to replace images in mail pieces addressed to the state of Colorado. A single criterion can be referenced by multiple mark-up instructions: for instance, an instruction to insert a barcode and an instruction to replace images can both reference the same criterion. In this manner, the combination of mark-up instructions and criteria can define a large number of arbitrary, independent, and selectable ways of modifying the print job.

Once the print job has been modified based on the mark-up instructions, the altered PDF print job is sent to printer 130 for printing. Therefore, the newly printed job will include printable content that differs from the originally submitted print job. These changes can be made quickly and efficiently, even though the print job has already been defined in PDF and sent out from a client for printing.

The method of FIG. 2 streamlines the editing process at a print shop, and quickly allows a print shop to manipulate large-scale PDF print jobs that have already been generated. Furthermore, the process may be performed automatically using previously-defined criteria and mark-up instructions, all without operator intervention. For example, method 200 allows a print shop to automatically manipulate advertisements, repeating segments of text, etc.

Criteria stored in memory 126 and described above may indicate where the borders exist between the different mail pieces within the print job. For example, a group of criteria may be assembled into a rule that describes tags, which are patterns of PDF print data that indicate the borders between billing statements, etc. (e.g., a border may be indicated by a barcode placed next to a page break, by a change in fonts, etc.). Other ways to identify segments of print data (e.g., mail pieces) include specifying the number of pages each mail piece contains, specifying one or more conditional triggers that must be true, false, or found in a specific combination, or specifying PDF metadata (e.g., a PDF comment) that is used to identify mail-piece boundaries. For example, the identification of mail-piece boundaries may be based on conditional triggers (also referred to as semantic triggers). Each such trigger can test for the existence or non-existence of: printable PDF content (e.g., text or images) and position (e.g., the physical location of text on a page); file metadata (e.g., page number); and job metadata (e.g., a job ID). For example, pseudo-code for a rule that includes a trigger may indicate that:

---

IF (page contains text "ABC" at position X) AND (page is the last page in mail piece) THEN page matches criteria.

---

In a further embodiment, markup engine 124 is operable to select the mark-up instructions and criteria that are used together to identify/change the printable content of the print job. For example, markup engine 124 may select a set of mark-up instructions based on properties of the print job, the identity of the customer that submitted the print job, a user's selection, etc. In another example, a user may select which criteria are referenced by each mark-up instruction.

In another further embodiment, a user may wish to create the criteria and mark-up instructions that are used to identify and modify PDF print data. In these embodiments, the user may provide a template version of a PDF print job that substantially matches the expected format of incoming print jobs. For example, the template may include text, images, borders, barcodes, etc. placed at expected locations and in sizes and fonts that match those of expected print jobs, even though the content of such elements will vary on a job-by-job basis. The user can then define criteria by referring to the template PDF print job. These criteria may be based on the location of certain PDF objects with respect to each other within the template. For example, a user could use the template to generate criteria indicating that a new mail piece exists within the print job immediately after each address within the print data. In another example, a user can select text on a page and can create a rule (a logical criteria set) which is fulfilled if this text is found in the specified position on a page, and the page is also the first page in a mail piece.

A user may further associate each mark-up instruction with one or more criteria. This may involve combining the criteria with the use of one or more logical operators, and then storing this information in memory for each mark-up instruction.

A user may further define criteria and mark-up instructions for data-mining the PDF print job. For example, the user may identify specific components of an address to be extracted and stored in a database. In a further embodiment, address information may be exported to an external entity that corrects formatting errors in the addresses and returns corrected address information. In this way, any invalid addresses may be replaced prior to printing.

In another embodiment, markup engine 124 uses the markup instructions to alter the segments of PDF data by re-arranging the order of the segments within the print job. This can be beneficial when the segments of print data are mail pieces, because, for example, the United States Postal Service provides discounts when mail pieces are grouped by zip code. By changing the order of the individual segments, markup engine 124 can sort the contents of an incoming PDF print job in order to achieve a postal discount, even when the originally received job was not grouped by zip code.

The systems and methods described above with respect to FIGS. 1-2 may be particularly useful in print shops that utilize an inserter machine. An inserter machine inserts printed content (e.g., flyers) into envelopes. When used together with an inserter machine, markup system 120 may insert barcodes into a print job so that the inserter machine can track each mail piece of the print job after the mail pieces have been printed. The inserter machine may then identify each mail piece that has been inserted successfully into an envelope, based on the bar code of the mail piece. The inserter machine may also report information to markup system 120 indicating the barcodes of the mail pieces that were not properly inserted. If the inserter encountered a failure for a given mail piece, markup system 120 may then re-send the mail piece for re-printing and insertion.

In some embodiments, inserter machines require incoming mail pieces to include consecutive barcodes. In these cases, markup system 120 identifies the mail pieces that will be re-printed, and changes the mark-up instructions stored in memory 126 in order to re-number the barcode of each improperly printed mail piece. In this way, when the mail pieces are re-printed they will have consecutive barcodes with respect to each other. The mail pieces with the new barcodes may then be re-processed by the inserter machine.

EXAMPLES

Figure 5:
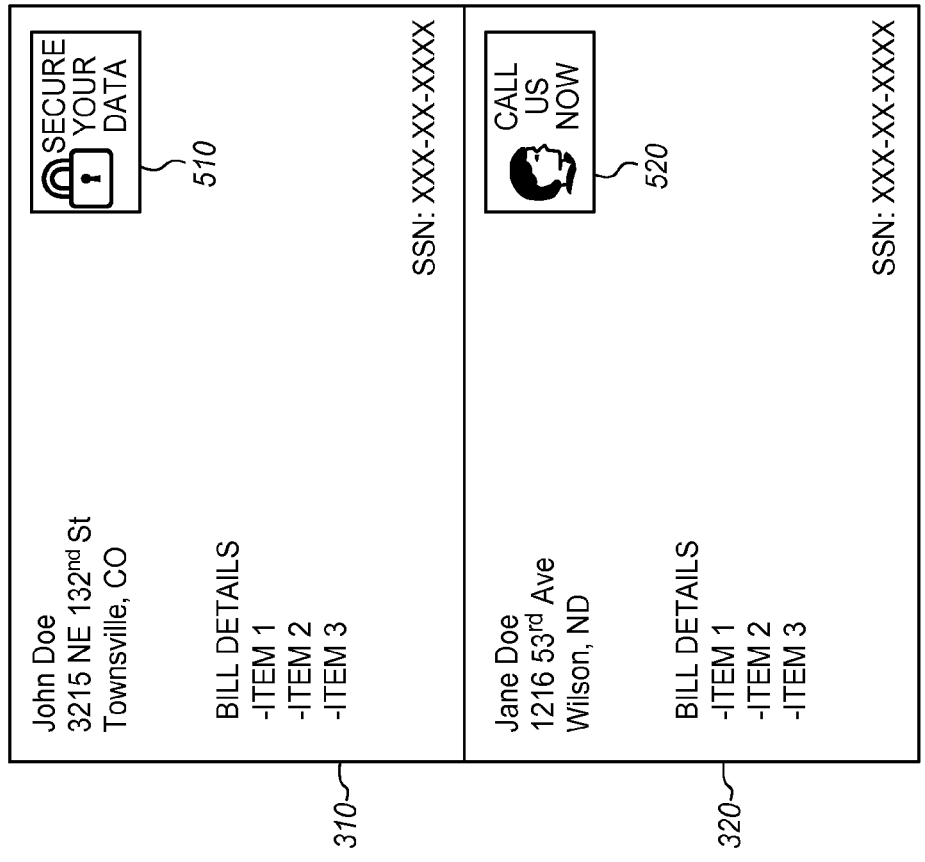
FIG. 5 is a block diagram illustrating replacement data inserted into the regions of FIG. 4 in an exemplary embodiment.

In the following examples, additional processes, systems, and methods are described in the context of a markup system that modifies incoming PDF print jobs scheduled for printing. In particular, FIGS. 3-5 illustrate an exemplary process by which mail pieces of a print job are altered by a markup system.

FIG. 3 is a block diagram illustrating two mail pieces 310 and 320 separated by a page break in an exemplary embodiment. In this embodiment, mail pieces 310 and 320 each comprise a single page of a twenty-page print job that has been received by the markup system. Each mail piece includes a billing statement for a credit card of a customer. FIG. 3 also illustrates a set of mark-up instructions and criteria stored in memory 330 and used for altering printable content located within each mail piece. When the markup system receives the print job, it analyzes mark-up instructions and criteria stored in memory 330 to determine how to alter the mail pieces.

FIG. 4 is a block diagram illustrating regions identified on the two mail pieces of FIG. 3 in an exemplary embodiment. Alteration 1 includes a criterion that indicates a specific format for social security numbers as a series of numerals and dashes within each mail piece. The markup system therefore reviews the PDF print data by parsing it to identify printable content that matches this criterion. In each mail piece, the only region of printable content that matches the criterion is region 410, located at the bottom left corner.

Alteration 2 includes criteria that require the markup system to identify two different regions. For rule 1 (and at the same time that the PDF print data is being parsed for Alteration 1), the markup system parses the print data of each mail piece to check for content that matches Alteration 2. This time, the only two-letter state code located on the third line of the page is found in region 430 of each mail piece, and the only image located at the indicated page position for each mail piece is a placeholder image 420 located in the top right of the page.

The markup system then references mark-up instructions for each alteration, and alters the matching PDF print data of each mail piece to implement the changes required by the mark-up instructions. Specifically, in accordance with the mark-up instructions, the markup system deletes (or places a white box over) the social security number for each mail piece, and inserts a textual field labeled "XXX-XX-XXXX" in place of the social security number. The markup system further replaces the placeholder images with new images, based on the state of the customer who will receive each mail piece.

FIG. 5 is a block diagram illustrating replacement data inserted into the regions of FIG. 4 in an exemplary embodiment. FIG. 5 shows the mail pieces after the data has been replaced. The PDF file has been directly edited in order to accomplish the desired alterations. Note that the "SSN" field has been anonymized, while the placeholder images have been replaced with image 510 and 520, based on the state of the customer. The markup system then sends the altered print job to a printer, which prints out the modified version of each mail piece.

Figure 6:
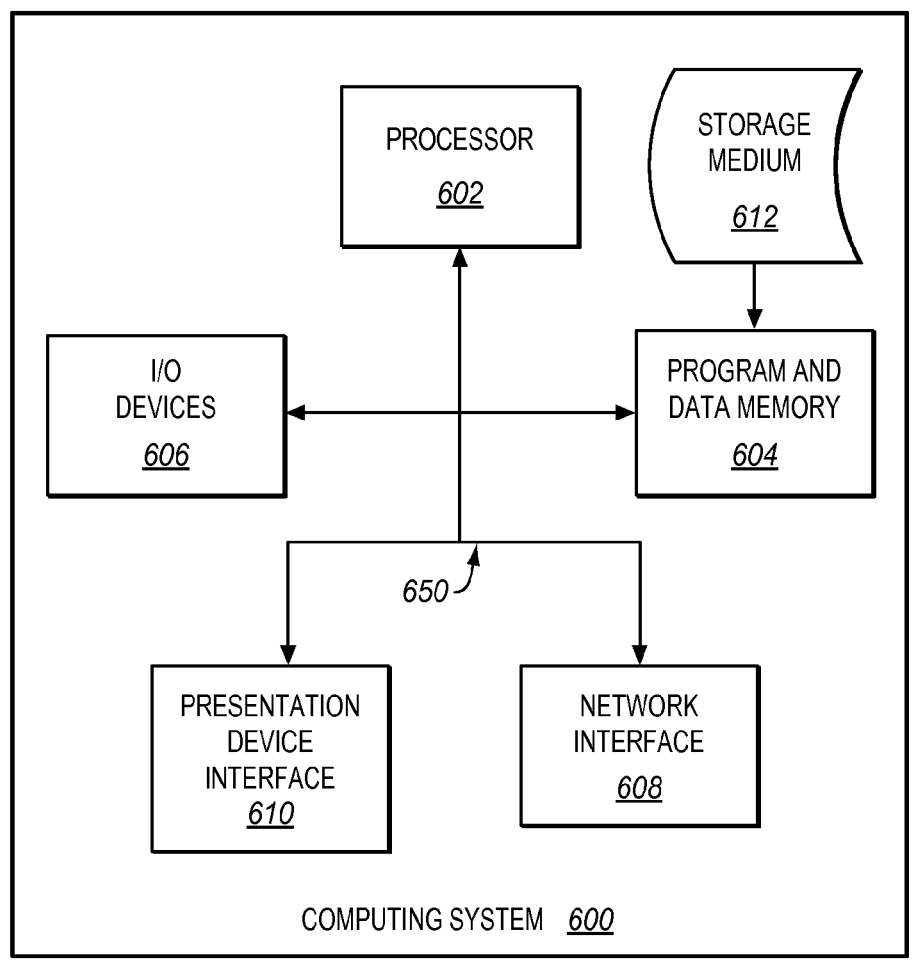
FIG. 6 illustrates a processing system operable to execute a computer-readable medium embodying programmed instructions to perform desired functions in an exemplary embodiment.

Embodiments disclosed herein can take the form of software, hardware, firmware, or various combinations thereof. In one particular embodiment, software is used to direct a processing system (e.g., custom circuitry or a processor) of markup system 120 to perform the various operations disclosed herein. FIG. 6 illustrates a processing system 600 operable to execute a computer-readable medium embodying programmed instructions to perform desired functions in an exemplary embodiment. Processing system 600 is operable to perform the above operations by executing programmed instructions tangibly embodied on computer-readable storage medium 612. In this regard, embodiments of the invention can take the form of a computer program accessible via computer-readable medium 612 providing program code for use by a computer or any other instruction execution system. For the purposes of this description, computer-readable storage medium 612 can be anything that can contain or store the program for use by the computer.

Computer-readable storage medium 612 can be an electronic, magnetic, optical, electromagnetic, infrared, or semiconductor device. Examples of computer-readable storage medium 612 include a solid state memory, a magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be integrated with the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A system comprising:
a printing system that includes:
a memory that includes criteria for identifying Portable Document Format (PDF) content stored in print jobs, and that also includes a mark-up instruction for altering printable PDF content stored in print jobs, where the mark-up instruction references one or more of the criteria;
an interface operable to receive a PDF print job for processing; and
a markup engine operable to access the mark-up instruction, to review the PDF print job to identify multiple segments of the print job that each include PDF content that matches the one or more criteria referenced by the mark-up instruction, and to alter the identified segments based on the mark-up instruction.

2. The system of claim 1 wherein:
the markup engine is further operable to alter the identified segments by deleting printable PDF content within the identified segments.

3. The system of claim 1 wherein:
the markup engine is further operable to alter the identified segments by inserting printable PDF content within the identified segments.

4. The system of claim 1 wherein:
the markup engine is further operable to divide the PDF print job into segments, and to alter the identified segments by changing an order of the identified segments within the PDF print job.

5. The system of claim 1 wherein:
the markup engine is further operable to alter the identified segments by adding barcodes for an inserter machine, and to initiate printing of the PDF print job, and
the markup engine is further operable to select a segment of the print job that was not properly inserted by the inserter machine, to process the PDF print job based on the criteria to alter the barcode of the selected segment, and to initiate printing of the selected segment with the altered barcode.

6. The system of claim 1 wherein:
the mark-up instruction references one or more criteria as a prerequisite for altering a segment.

7. The system of claim 1 further comprising:
a user interface operable to display a sample PDF file to a user that substantially matches a layout of the PDF print job, to receive input from the user defining the criteria for identifying segments based upon the sample PDF file, to receive input from the user defining the mark-up instructions for altering segments based upon the sample PDF file,
the markup engine further operable to store the user-defined criteria and mark-up instructions in the memory.

8. A method comprising:
receiving, at an interface of a printing system, a Portable Document Format (PDF) print job for processing; and
accessing, from a memory of the printing system, a mark-up instruction for
altering printable PDF content stored in the print job, where the mark-up instruction references one or more criteria stored in the memory;
accessing, from the memory, the one or more criteria referenced by the mark-up instruction, where the criteria identify PDF content stored in the print job;
reviewing, via a markup engine of the printing system, the PDF print job to
identify multiple segments of the print job that each include PDF content that matches the referenced criteria; and
altering the identified segments based on the mark-up instruction.

9. The method of claim 8 wherein:
altering the identified segments includes deleting printable PDF content within the identified segments.

10. The method of claim 8 wherein:
altering the identified segments includes inserting printable PDF content within the identified segments.

11. The method of claim 8 further comprising:
dividing the PDF print job into segments, wherein
altering the identified segments includes changing an order of the identified segments within the PDF print job.

12. The method of claim 8 wherein:
altering the identified segments includes adding barcodes for an inserter machine, and the method further includes:
initiating printing of the PDF print job;
selecting a segment of the print job that was not properly inserted by the inserter machine;
processing the PDF print job based on the criteria to alter the barcode of the selected segment; and
initiating printing of the selected segment with the altered barcode.

13. The method of claim 8 wherein:
the mark-up instruction references one or more criteria as a prerequisite for altering a segment.

14. The method of claim 8 further comprising:
displaying a sample PDF file to a user that substantially matches a layout of the PDF print job;
receiving input from the user defining criteria for identifying segments based upon the sample PDF file;
receiving input from the user defining mark-up instructions for altering segments based upon the sample PDF file; and
storing the user-defined criteria and mark-up instructions in the memory.

15. A non-transitory computer-readable medium embodying programmed instructions which, when executed by a processor, are operable for performing a method comprising:
receiving, at an interface of a printing system, a Portable Document Format (PDF) print job for processing; and
accessing, from a memory of the printing system, a mark-up instruction for
altering printable PDF content stored in the print job, where the mark-up instruction references one or more criteria stored in the memory;

accessing, from the memory, the one or more criteria referenced by the mark-up instruction, where the criteria identify PDF content stored in the print job;

reviewing, via a markup engine of the printing system, the PDF print job to identify multiple segments of the print job that each include PDF content that matches the referenced criteria; and altering the identified segments based on the mark-up instruction.

16. The medium of claim 15 wherein:

altering the identified segments includes deleting printable PDF content within the identified segments.

17. The medium of claim 15 wherein:

altering the identified segments includes inserting printable PDF content within the identified segments.

18. The medium of claim 15, the method further comprising:

dividing the PDF print job into segments, wherein altering the identified segments includes changing an order of the identified segments within the PDF print job.

19. The medium of claim 15 wherein:

altering the identified segments includes adding barcodes for an inserter machine, and the method further includes:

initiating printing of the PDF print job;

selecting a segment of the print job that was not properly inserted by the inserter machine;

processing the PDF print job based on the criteria to alter the barcode of the selected segment; and initiating printing of the selected segment with the altered barcode.

20. The medium of claim 15 wherein:

the mark-up instruction references a criterion as a prerequisite for altering a segment.

* * * * *